(12) United States Patent
Muller

(10) Patent No.: US 6,771,267 B1
(45) Date of Patent: Aug. 3, 2004

(54) MERGING DIGITAL FONTS

(75) Inventor: Eric Muller, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/532,405

(22) Filed: Mar. 22, 2000

(51) Int. Cl.[7] ............................................. G06T 11/00
(52) U.S. Cl. ...................................................... 345/467
(58) Field of Search ........................ 358/1.11; 345/641, 345/467, 469, 468, 471, 472; 715/542

(56) References Cited

U.S. PATENT DOCUMENTS

| | | | | |
|---|---|---|---|---|
| 4,594,674 A | * | 6/1986 | Boulia et al. | 345/471 |
| 4,857,904 A | * | 8/1989 | Schoon | 345/469.1 |
| 4,881,197 A | * | 11/1989 | Fischer | 707/517 |
| 5,221,921 A | * | 6/1993 | Statt | 345/471 |
| 5,289,169 A | * | 2/1994 | Corfield et al. | 345/469.1 |
| 5,412,771 A | * | 5/1995 | Fenwick | 345/468 |
| 5,416,898 A | * | 5/1995 | Opstad et al. | 345/468 |
| 5,420,610 A | * | 5/1995 | Takahashi | 345/471 |
| 5,468,077 A | * | 11/1995 | Motokado et al. | 345/468 |
| 5,526,477 A | * | 6/1996 | McConnell et al. | 345/467 |
| 5,533,174 A | * | 7/1996 | Flowers et al. | 358/1.15 |
| 5,586,241 A | * | 12/1996 | Bauermeister et al. | 345/170 |
| 5,664,086 A | * | 9/1997 | Brock et al. | 345/468 |
| 5,699,077 A | * | 12/1997 | Hosotani | 345/536 |
| 5,825,987 A | * | 10/1998 | Asada | 358/1.11 |
| 5,949,435 A | * | 9/1999 | Brock et al. | 345/468 |
| 5,956,419 A | * | 9/1999 | Kopec et al. | 382/159 |
| 6,313,920 B1 | * | 11/2001 | Dresevic et al. | 358/1.11 |
| 6,356,268 B1 | * | 3/2002 | Beaman et al. | 345/467 |
| 6,421,055 B1 | * | 7/2002 | Jones et al. | 345/471 |
| 6,426,751 B1 | * | 7/2002 | Patel et al. | 345/468 |

OTHER PUBLICATIONS glyph—a whatis definition, retrieved from the internet: <URL:wysiiwyg://13/http://whatis.techtar . . . on/0, 289893.sid9_gci212200,00.htm>.*
glyph—a whatis definition, retrieved from the internet: <URL:wysilwyg://13/http://whatis.techtar . . . on/0, 289893.sid9_gci212200,00.html>.*
glyph—a whatis definition, retrieved from the internet: <URL:wysiiwyg://13/http://whatis.techtar . . . on/0, 289893.sid9_gci212200,00.htm>.*
"Open Type Layout Tag Registry", Adobe Solutions Network: Developer Program, (1999) pp. 1–5.
"cmap—Character To Glyph Index Mapping Table", Adobe Solutions Network: Developer Program, (1999) pp. 1–6.
"Overview", Adobe Solutions Network: Developer Program, (1999) pp. 1–2.
"Advanced Typographic Extensions—Open Type Layout", Adobe Solutions Network: Developer Program, (1999) pp. 1–10.
"The Open TypeFont File", Adobe Solutions Network: Developer Program, (1999) pp. 1–19.
"Open Type™ Layout Common Table Formats", Adobe Solutions Network: Developer Program, (1999) pp. 1–27.

* cited by examiner

Primary Examiner—Michael Razavi
Assistant Examiner—Ryan Yang
(74) Attorney, Agent, or Firm—Fish & Richardson P.C.

(57) ABSTRACT

A computer-implemented method of combining fonts. A first plurality of glyphs from a first font and a second plurality of glyphs from a second font are copied into a combined font, each glyph in the combined font being assigned a unique identification code. A mapping is generated of a first plurality of code points in an encoding scheme to the identification codes of the first plurality of glyphs in the combined font, and a substitution feature is generated in the combined font that can substitute at least one of the first plurality of glyphs in the combined font with at least one of the second plurality of glyphs in the combined font.

16 Claims, 3 Drawing Sheets

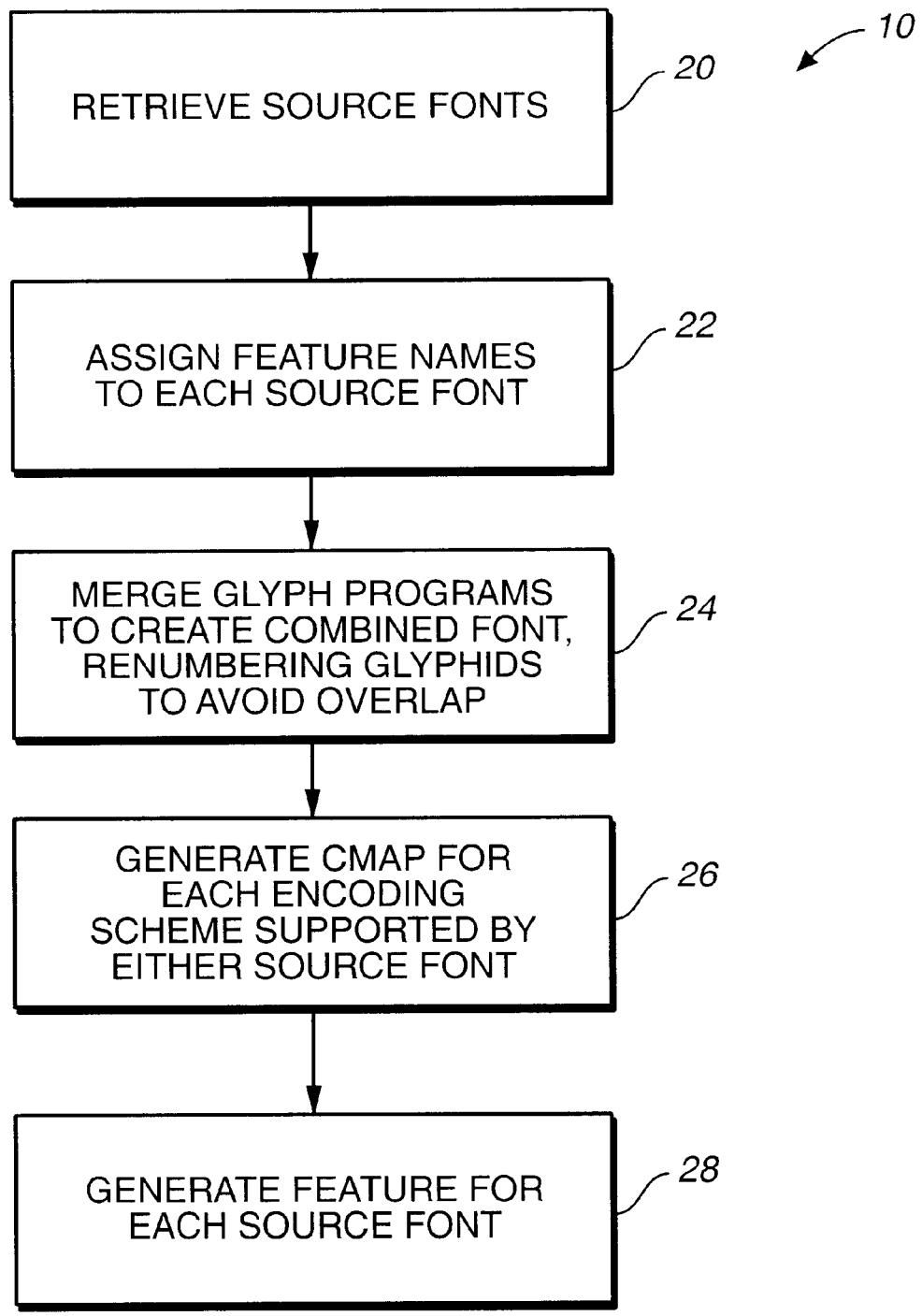
FIG._1

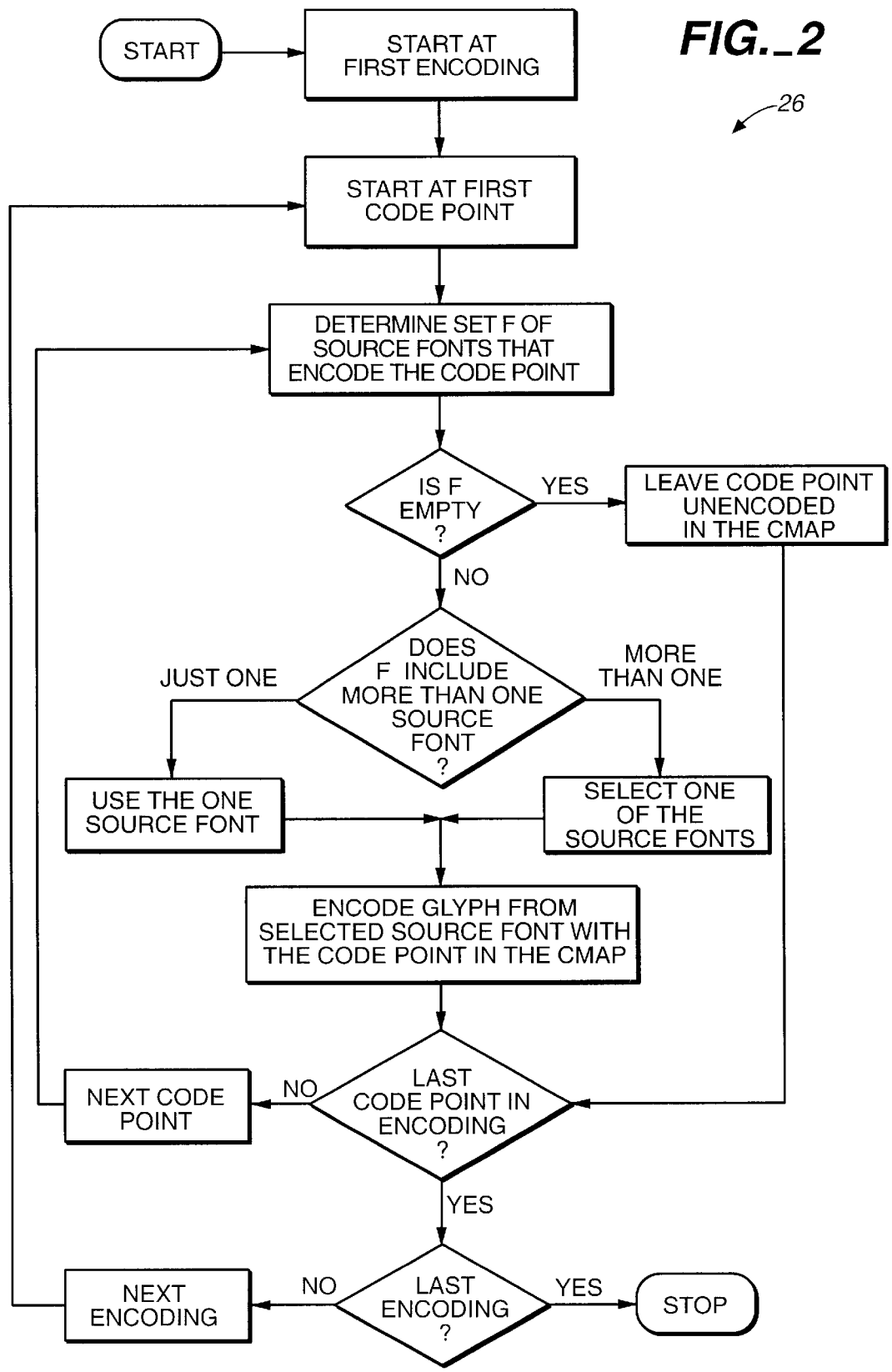
FIG._2

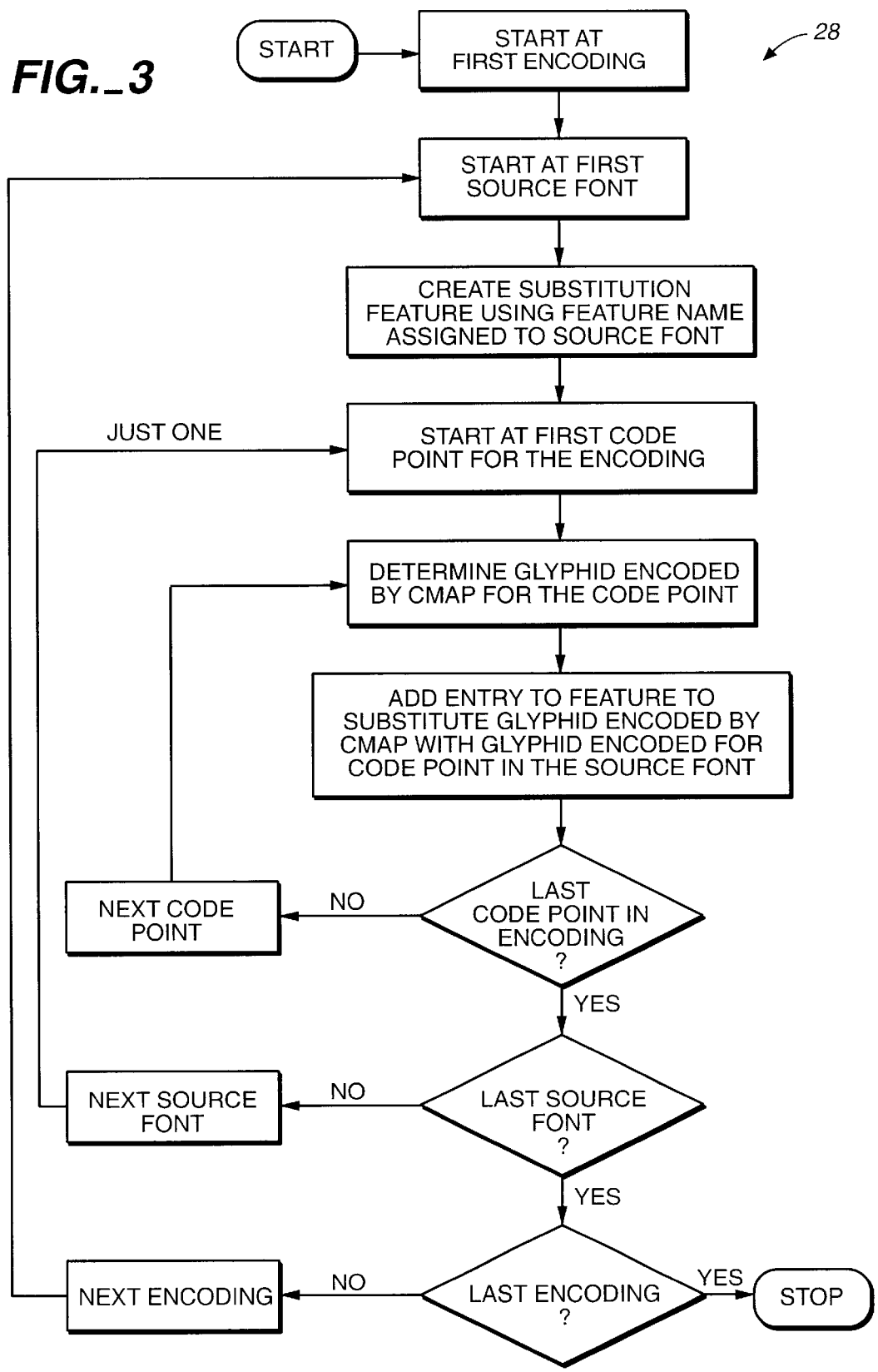
FIG._3

MERGING DIGITAL FONTS

BACKGROUND

The present invention relates to methods of managing digital fonts.

In the context of digital typography, the term "character" refers to the general concept of a letter, number, symbol, ideograph or the like, without reference to a particular font, whereas the term "glyph" refers to a specific instance of a character in a font. In this specification, the terms will be used in this sense, although they are sometimes used interchangeably. A font is a collection of glyphs with a single aesthetic design, e.g., regular Times New Roman. A collection of fonts with visually related styles, e.g., regular, bold, italic and bold italic versions of Time New Roman, can be referred to as a "typeface" or a "font family", although sometimes this collection of related styles is considered to be a single "font".

Digital typefaces and fonts, such as the PostScript® font products available from Adobe Systems Incorporated of San Jose, Calif., generally include instructions for rendering glyphs on an output device, such as a printer or monitor. A conventional digital font, such as the PostScript Type 1 font format, can include only a limited number of glyphs. For example, a Type 1 font usually includes no more than 256 glyphs. Since some font families include more than 256 glyphs, the related styles must be packaged as separate digital fonts. For example, the Adobe Garamond Type 1 font is packaged as a Regular font, a Small Caps and Old Style Figures font, and an Expert font. This makes it difficult for a user to compose text that mixes the various styles.

More recent font formats, such as the OpenType font format, can include a large number of glyphs. In addition, OpenType fonts include a glyph substitution mechanism that permits a font designer to specify both a feature and a set of glyph substitutions to perform if the feature is activated. For example, an OpenType font can include multiple glyphs for the same character, e.g., non-italic and italic versions, and a feature that specifies whether the italic version of the character should be used instead of the non-italic version.

Although OpenType fonts can include multiple versions of the same character, some OpenType fonts will continue to be constructed in a conventional fashion, with different styles packaged in separate digital fonts. In addition, if existing digital fonts in the PostScript Type 1 font format are converted to the OpenType font format, e.g., with an Adobe OpenType Converter program, these converted fonts will also be separated into multiple font packages per font family. Consequently, users will still experience difficulties when composing text that mixes various styles from these separately packaged digital fonts.

SUMMARY

In one aspect, the invention is directed to a computer-implemented method of combining fonts. In the method, one of two fonts is identified as a first font and the other of the two fonts is identified as a second font. The first font contains a first plurality of glyphs, and the second font contains a second plurality of glyphs. Each glyph including rendering instructions. The first plurality of glyphs from the first font and the second plurality of glyphs from the second font are copied into a combined font, each glyph in the combined font being assigned a unique identification code. A mapping of a first plurality of code points in an encoding scheme to the identification codes of the first plurality of glyphs in the combined font is generated, and a substitution feature is generated in the combined font that can substitute at least one of the first plurality of glyphs in the combined font with at least one of the second plurality of glyphs in the combined font.

Implementations of the invention can include the following features. The substitution feature can include a mapping of the identification codes of the first plurality of glyphs in the combined font to the identification codes of the second plurality of glyphs in the combined font. A name of the second font can be assigned to the feature substitution, e.g., from user input, from a font name stored in the second font, or by removing a common prefix from the names of the first and second fonts. One of the two fonts can be identified as the first font from user input, from the font names of the two fonts, or by which font contains a glyph that represents a preselected code point. A third plurality of glyphs can be copied from the second font to the combined font, and the mapping can include mappings between the third plurality of glyphs in the combined font and a second plurality of code points in the encoding scheme. A fourth plurality of glyphs can be copied from the first font to the combined font, and the substitution feature in the combined font can substitute at least one of the fourth plurality of glyphs with at least one of the third plurality of glyphs. Copying the first and second pluralities of glyphs into a combined font can includes renumbering identification codes to prevent overlapping identification codes in the combined font. The first and second fonts include glyphs from the same font family, glyphs from the different font families, or glyphs that represent characters from different languages.

Advantages that can be seen in specific implementations of the invention include one or more of the following. Separately packaged digital fonts, particularly separately packaged OpenType fonts, can be combined into a single font package. One or more features in the combined OpenType font can be used to access the glyphs from the two digital fonts. Separately packaged fonts from the same font family can be combined, and fonts that are not traditionally considered part of the same font family can be merged. Glyphs sets from different alphabets can be merged into a single digital font. The process of combining separate fonts can be automated to require minimal user interaction.

BRIEF DESCRIPTION OF THE DRAWINGS

FIG. 1 is a flow diagram of a method of combining digital fonts according to the present invention.

FIG. 2 is a flow diagram of a method of generating a cmap table for the combined digital font.

FIG. 3 is a flow diagram of a method of generating features for the combined digital font.

DETAILED DESCRIPTION

In brief, the invention provides a computer-implemented method of combining two or more digital fonts to create a single digital font that includes the glyphs of the original digital fonts. In this application, a "character" is a letter, number, symbol, ideograph or the like, without reference to a particular font, whereas a "glyph" is a particular instance of a character. In a digital font, glyphs can be defined by instructions that are executed or interpreted to render the glyph, so the term "glyph" can also refer to the portion of a font program used to generate an instance of a character.

Before describing the invention in detail, the OpenType digital font format and its interaction with an application that views or prints a text document, e.g., a word processing program or an Internet browser, will be described briefly. In general, in a text document, each instance of a character is represented by a "code point", i.e., unique numeric value. The code point that is assigned to the character depends upon the encoding scheme. For example, in the Unicode encoding scheme, the code point 65 is assigned to the character "A".

As previously mentioned, an OpenType font can contain a large number of individual glyphs. Each glyph in an OpenType font is assigned a glyphID, i.e., a unique numeric identification code. The glyphIDs for the glyphs in an OpenType font need not, and usually do not, correspond to the code points used in the text document to represent the equivalent characters. Therefore, an OpenType font includes a mapping, contained in a table traditionally called a "cmap", which matches the code points of a given encoding scheme of the text to the glyphIDs for the glyphs in the digital font. For example, a cmap table for the Unicode encoding scheme will assign the glyphID for a glyph that looks like an "A" to code point 65. It is possible that a given mapping does not match a given code point. For example, if a font does not contain an "A" glyph, the cmap for the Unicode encoding will not contain an entry for code point 65. On the other hand, if a font contains multiple glyphs for the character "A", e.g., the glyph "*A*" in an italic style and the glyph "A" in a non-italic style, then the cmap table will assign only one glyphID, e.g., the glyphID for the non-italic glyph "A", to the code point 65. If the OpenType font supports multiple encoding schemes, there will be a cmap table for each encoding scheme.

OpenType fonts also include "features". Each feature is designated by a "feature name", the presence of which in a font code in the text document determines whether the feature is to be activated when the document is rendered. In the OpenType font format, each feature name must be a four-byte sequences of characters. One function that can be performed with features is glyph substitution. For example, some fonts include a set of glyphs in the 'small capitals' style. The presence of a 'small capitals' feature indicates that, instead of the glyphs for the usual lower case letters, the glyphs with the 'small capitals' style should be used instead. This glyph substitution function can be performed with a glyph substitution table that matches an old glyphID to a new glyphID. For example, if the glyphID for the glyph "a" is 1, and the glyphID for the glyph "A" in the small capital style is 2, the small capital feature will include a table entry that substitutes glyphID 2 for glyphID 1 when the 'small capitals' feature is activated. If an OpenType format font includes multiple features, there can be one glyph substitution table for each feature.

When a character is displayed on an output device, the code point for the character is taken from the text document, the glyphID for that code point is determined from the cmap and features of the OpenType font, and the glyph program associated with that glyphID is used to render the character.

FIG. 1 illustrates a computer-implemented method 10 of merging two digital source fonts to create a single combined digital font. The method is performed by a computer program that may be implemented in hardware, firmware, software, or combinations thereof, and the program can be tangibly embodied in any sort of computer readable storage device, such as volatile and non-volatile memory, including semiconductor memory devices, magnetic disks, magneto-optical disks, and optical disks. The method can be performed in different devices, such as computers or printers, and in different types of computer programs, such as operating systems, applications, or printer drivers.

The method typically begins with storage of the two source fonts (step 20). The two source fonts can be stored in a volatile storage, such as the memory of a device, e.g. a computer, or in a non-volatile storage, e.g., a magnetic disk. The two source fonts can include glyphs from fonts in the same font family, or the two source fonts can include glyphs that would be considered to be from different font families. The two source fonts can include overlapping character sets, i.e., some characters that would otherwise be assigned the same code point in a particular encoding scheme. For example, one source font can include the glyph "A" in the Arial font, and the other source font can include the glyph "A" in Courier font. Alternatively, the character sets from the two source fonts can be non-overlapping. For example, one source font can include only uppercase letters, and the other source font can contain only lowercase letters. The two source fonts can include glyphs from the same writing system, e.g., Roman letters, or the two source fonts can include glyphs from different writing systems, e.g., Roman letters and Cyrillic letters or Japanese kanji characters. Of course, if the two source fonts include glyphs from different writing systems, it is possible for the fonts to include no overlapping characters.

A feature name, which can be different from the font name, is assigned to each source font (step 22). The feature name can be received from a user in the form of user input. Alternatively, the feature name can be extracted or derived automatically by the computer program from the name of the source font. For example, the computer program can remove a common prefix from the names of the source fonts, and use the remainder or suffix for the feature name of each font. Because the OpenType font format requires that feature names be composed of four characters, the remainder or suffix may need to be shortened. The computer program can maintain a list of common features, and a list of abbreviations, acronyms, pre-assigned feature names, and the like, and use the shortened form if the remainder or suffix matches one of the features in the list.

Once feature names have been assigned to the two source fonts, the glyphs are merged into a single digital font (step 24). Specifically, each glyph program is copied in turn into the combined font. As each glyph program is copied, the table entries that identify the glyph in the source font are also copied into new tables in the combined font. The font merging program can copy all of the glyphs from one source font and then all of the glyphs from the second source font, alternate between source fonts when copying glyphs, or use other methods.

Some or all of the glyphIDs of the glyphs in one or both source fonts are renumbered as the glyphs are copied so that no two glyphs have the same glyphID. For example, if two fonts, such as Minion and Myriad, are being merged, and the glyphID for an uppercase "A" is 500 in Minion and 500 in Myriad, then in the combined font, the upper case "A" glyph from Minion can be assigned a glyphID 1 and the uppercase "A" glyph from Myriad can be assigned glyphID 2. The glyphIDs in other tables in the OpenType font, e.g., the GSUB and GPOS tables, are modified as the table entries are copied in order to match the renumbered glyphIDs. In this example, whenever a reference to glyphID 500 is copied from Minion to the combined font, it is replaced by a reference to glyphID 1, whereas whenever a reference to glyphID 500 is copied from Myriad to the combined font, it is replaced by a reference to glyphID 2.

Once the glyphIDs have been assigned to the glyphs of the combined font, a primary code point to glyphID association table, i.e., a cmap for an OpenType font, is generated for the combined font (step 26). As illustrated in FIG. 2, for each code point in an encoding scheme supported by the font, the program determines the set F of source fonts that encode the code point. If the set F is empty, then the code point is left unencoded. If the set F contains one source font, then the modified glyphID for the glyph encoded by the font for that code point is placed in the cmap. If the set F contains more than one source font, then one font is selected, and the glyphID for the glyph from the selected font is used in the cmap. The selection of one of the fonts can be determined from an initial user input. Alternatively, the selection can be determined by the computer based on the remainder of the font name, e.g., the computer can select the font with an empty suffix or the suffix "Regular". For example, assuming that the first font is selected as the primary font, the cmap for the combined font will map the code point 65 to the glyphID 1.

In another implementation that is particularly useful if the source fonts contain glyphs for different character sets, e.g., a Roman alphabet and a Greek alphabet, the font program can determine which source font includes a particular code point, and use that source font for the primary glyphs. For example, the program can search the source fonts with Unicode encoding for the code point 65 (which represents the letter "A" in Unicode). Since the source font with Roman characters includes the code point 65, but the source font with the Greek alphabet does not, the first source font will be used for the primary glyphs representing Roman characters. Similarly, the primary glyph for the code point 947 (which represents the Greek letter gamma in Unicode) will come from the source font with Greek font. This will permit both sets of glyphs to be accessed from a single font, without requiring the use of features.

In another implementation, only a certain set of code points from various source fonts are used to generate the primary glyphs. For example, one source font can be used for the Roman characters, a second source font can be used for katakana characters, a third source font can be used for kanji characters, and a fourth source font can be used for specialized kanji characters. Where the source fonts contain overlapping sets of characters, the alternate characters would then be available through use of the features. The resulting font can be simple for a text application to use, because the application only needs a font engine that supports the basic OpenType font format, and yet it has access to a full suite of Roman, katakana and kanji characters.

The process may be repeated for each encoding supported by each font, thus creating a cmap for each supported encoding scheme. In a particular encoding, the glyph encoded by the cmap for a particular code point can be referred to as a primary glyph.

Once the cmap has been created for the combined font, substitution features are generated (step 28). As shown in FIG. 3, the following steps can be performed for encoding and each source font. Initially, a substitution feature is created using the feature name that was assigned to that source font in step 14. Then, for each code point that is supported by an encoding for either font, an entry is added to the substitution feature to transform the primary glyph for that code point to the glyph encoded by that code point for the other source font.

As an example, two fonts with overlapping character sets from different font families, e.g., "Myriad" and "Minion", can be merged, with the character "A" from "Myriad" assigned to glyphID 1 and the character "A" from "Minion" assigned to glyphID 2. Assuming that "Myriad" is selected as the primary font, then a cmap is generated that maps code points to the reassigned glyphIDs of "Myriad", e.g., glyphID 1 is assigned to code point 65. In addition, two features are created. When the "Minion" feature is active, glyphID 1 is replaced by glyphID 2. When the "Myriad" feature is active, glyphID 1 is replaced by glyphID 1, so that no change in the glyphIDs is seen by the user.

As a result, the primary glyph is generated when no features are applied, or when a feature corresponding to the name of the first font is applied. However, a glyph from the second source font is used when a feature that corresponds to a non-primary font is applied. Thus, the glyphs from both source fonts are accessible in a single OpenType font, either through features (if the character sets overlap) or through different code points (if the character sets do not overlap).

In another implementation, rather than assigning a single feature to each font, a combination of features can be assigned. For example, if four source fonts are being combined, including italic and non-italic versions of a serif font and a sans serif font, then two features can be used: ital and sans, with the italic sans serif font requiring both features to be activated to be accessed. In this implementation, the ital feature table will transform glyphIDs for the serif glyphs into the glyphIDs for the italic serif glyphs and transform the glyphIDs for the sans serif glyphs into the glyphIDs for the italic sans serif glyphs. In addition, the sans feature table will transform the glyphIDs for the serif glyphs into the glyphIDs for the sans serif glyphs and transform the glyphIDs for the italic serif glyphs into the glyphIDs for the italic sans serif glyphs. Once the feature tables have been properly constructed, applying the features in any order will have the desired effect.

The font combining program and source fonts need not reside in the same computer or hardware device. For example, the components used in the method can be distributed across a computer network. In addition, the processor and memory may be embedded in a peripheral device, such as a PostScript® laser printer.

What is claimed is:

1. A computer-implemented method of combining fonts, comprising:

identifying one of two fonts as a first font and the other of the two fonts as a second font, the first font containing a first plurality of glyphs and the second font containing a second plurality of glyphs, each glyph including rendering instructions;

copying the first plurality of glyphs from the first font and the second plurality of glyphs from the second font into a combined font, each glyph in the combined font being assigned a unique identification code;

generating a mapping of a first plurality of code points in an encoding scheme to the identification codes of the first plurality of glyphs in the combined font; and generating a substitution feature in the combined font that can substitute at least one of the first plurality of glyphs in the combined font with at least one of the second plurality of glyphs in the combined font;

wherein copying the first and second pluralities of glyphs into a combined font includes renumbering identification codes to prevent overlapping identification codes in the combined font.

2. The method of claim 1, wherein the substitution feature includes a mapping of the identification codes of the first plurality of glyphs in the combined font to the identification codes of the second plurality of glyphs in the combined font.

3. The method of claim 1, further comprising assigning name of the second font to the feature substitution.

4. The method of claim 3, wherein the name is determined from user input.

5. The method of claim 3, wherein the name is determined from a font name stored in the second font.

6. The method of claim 5, wherein the name is determined by removing a common prefix from the names of the first and second fonts.

7. The method of claim 1, wherein one of the two fonts is identified as the first font from user input.

8. The method of claim 1, wherein one of the two fonts is identified as the first font from font names of the two fonts.

9. The method of claim 8, wherein one of the two fonts is identified by removing a common prefix from the names of the first and second fonts.

10. The method of claim 1, wherein one of the two fonts is identified by which font contains a glyph that represents a preselected code point.

11. The method of claim 1, further comprising copying a third plurality of glyphs from the second font to the combined font, and the mapping includes mappings between the third plurality of glyphs in the combined font and a second plurality of code points in the encoding scheme.

12. The method of claim 11, further comprising copying a fourth plurality of glyphs from the first font to the combined font, and wherein the substitution feature in the combined font that can substitute at least one of the fourth plurality of glyphs with at least one of the third plurality of glyphs.

13. The method of claim 1, wherein the first and second fonts include glyphs from the same font family.

14. The method of claim 1, wherein the first and second fonts include glyphs from the different font families.

15. The method of claim 1, wherein the first and second fonts include glyphs that represent characters from different languages.

16. A computer program product, for combining fonts, tangibly stored on a computer-readable medium, the program comprising instructions operable to clause a programmable processor to:

identify one of two fonts as a first font and the other of the two fonts as a second font, the first font containing a first plurality of glyphs and the second font containing a second plurality of glyphs, each glyph including rendering instructions;

copy the first plurality of glyphs from the first font and the second plurality of glyphs from the second font into a combined font, each glyph in the combined font being assigned a unique identification code;

generate a mapping of a first plurality of code points in an encoding scheme to the identification codes of the first plurality of glyphs in the combined font; and generate a substitution feature in the combined font that can substitute at least one of the first plurality of glyphs in the combined font with at least one of the second plurality of glyphs in the combined font;

wherein to copy the first and second pluralities of glyphs into a combined font includes to renumber identification codes to prevent overlapping identification codes in the combined font.

* * * * *

UNITED STATES PATENT AND TRADEMARK OFFICE
CERTIFICATE OF CORRECTION

PATENT NO. : 6,771,267 B1 Page 1 of 1
DATED : August 3, 2004
INVENTOR(S) : Eric Muller It is certified that error appears in the above-identified patent and that said Letters Patent is hereby corrected as shown below:

<u>Column 7,</u>
Line 1, after "assigning" insert -- a --.

Signed and Sealed this

Third Day of May, 2005

JON W. DUDAS
*Director of the United States Patent and Trademark Office*